UNITED STATES PATENT OFFICE.

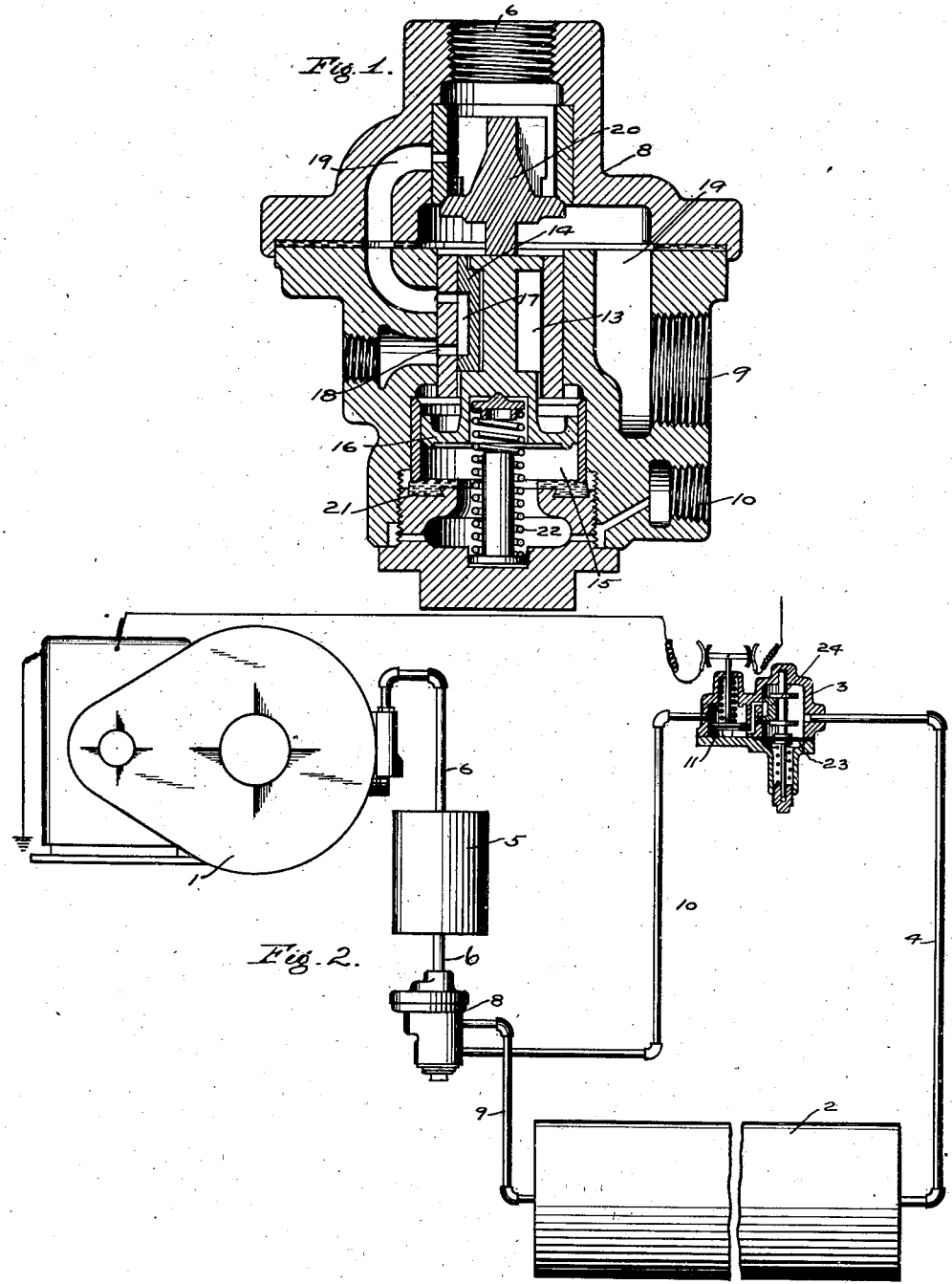

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

UNLOADING DEVICE FOR PUMPS.

1,021,808.   Specification of Letters Patent.   Patented Apr. 2, 1912.

Application filed August 8, 1908. Serial No. 447,531.

*To all whom it may concern:*

Be it known that I, WALTER V. TURNER, a citizen of the United States, residing at Edgewood, in the county of Allegheny and State of Pennsylvania, have invented new and useful Improvements in Unloading Devices for Pumps, of which the following is a specification.

This invention relates to unloading devices for pumps, and has reference more particularly to fluid compressors driven by electric motors having a low starting torque, such as motors of the polyphase type.

It has heretofore been proposed to provide a check valve device for the purpose of preventing back flow of air from the storage reservoir to the pump, and means for automatically relieving the pump piston of the pressure of the compressed fluid as the pump is cut out of action, so that when the pump is cut in the pump piston is free from the fluid pressure of the system during the first few strokes of the pump, and consequently the pump motor may readily and quickly work up to the normal operating speed before there is any considerable load acting against the pump piston.

The main object of my invention is to provide an improved device of the above character, which is reliable and certain in operation and which is adapted to be controlled by fluid under pressure.

In the accompanying drawing; Figure 1 is a central sectional view of a preferred form of valve device for controlling the release of fluid acting on the pump piston; and Fig. 2 a diagrammatic view illustrating a motor driven air compressor equipment with my improvements applied thereto.

As shown in Fig. 2, the invention is employed in connection with an equipment comprising an electric motor driven air compressor or pump 1, a storage reservoir 2, and a pump governor 3, connected by a pipe 4 to the storage reservoir 2. Intermediate the pump 1 and the storage reservoir 2 is a valve device 8 which is adapted to control the release of air from the air side of the pump piston, being connected by a pipe 9 with the storage reservoir 2 and by a pipe 6 to the pump. A small reservoir 5 may be interposed in the pipe 6 for the purpose of enlarging the capacity of the pipe 6 from the pump.

The valve device 8 preferably comprises a casing having a valve chamber 13 containing a slide valve 14 and a piston chamber 15 containing a movable abutment 16 for actuating the valve. The valve 14 is provided with a single cavity 17 for connecting an exhaust port 18 with a port 19 leading to pipe 6 in one position of the valve. Pipe 6 communicates by way of a passage 19 in the valve structure with pipe 9 leading to the storage reservoir 2, a check valve 20 being interposed in said passage so as to seat in the direction to prevent back flow of fluid from storage reservoir to pump. The check valve 20 is adapted to open by gravity and is so located in the valve structure that the same may be forced to its seat by the movement of the piston 16 and its stem.

The piston 16 is adapted to seat tightly on a gasket 21 in its outer position, and as valve chamber 13 is in open communication with passage 19 and the storage reservoir 2, the inner face of the piston is constantly subject to the reservoir pressure. The opposite side of the piston is subject to the pressure of a coil spring 22 and the piston chamber at that side of the piston is connected to a pipe 10 which has a port opening to the piston chamber of the pump governor, so located that when the actuating piston thereof is in the cut out position the port opening is below the piston and when in the cut in position the same is above the piston.

The governor shown in Fig. 2 represents an ordinary form of electric pump governor comprising a regulating diaphragm 23, subject to the opposing pressures of the pump and an adjustable spring and controlling a valve 24 adapted to admit and release fluid under pressure to and from the chamber 11 of the switch actuating piston 12. In cutting out the pump, air is admitted from the reservoir to the chamber 11 of the governor by operation of the regulating diaphragm, so that the piston moves to the cut out position and consequently air flows through the pipe 10 to one side of the abutment 16, and as the fluid pressures on the opposite sides of the abutment then become equal, the spring 22 carries and maintains the abutment 16 in its inner position, in which the cavity 17 in the valve 14 connects the port 19 leading to the pump with the exhaust port 18. The fluid in the small reservoir 5 and on the face of the air piston of the pump is thereupon exhausted to the atmosphere, so that thereafter, upon the governor acting to cut in the pump, the pump piston is free from the reservoir air pressure during the first strokes of the pump, and as a consequence, the electric pump motor readily and quickly builds up its speed to the normal operating degree. Upon movement of the actuating piston 16 to cut in position, the port opening of pipe 10 is connected with the chamber above the piston, which being open to the atmosphere, permits the fluid under pressure contained in the piston chamber 15 to escape to the atmosphere. The fluid pressure on the opposite side of the piston then shifts the piston to seat on the gasket 21, and the valve 14 cuts off communication to the exhaust port 18. The check valve being adapted to fall by gravity is now free to drop down and so open up communication through the passage 19 from the pump to the storage reservoir. By providing a check valve device of this character, two purposes are served, first, the fluttering movement of the check valve on its seat due to the pump impulses where an ordinary spring check valve is employed is prevented, and second, as the valve is held tightly to its seat by the piston 16 in the cut out position, liability of leakage around the check valve is obviated. As the employment of the small reservoir 5 is merely to secure an increased volume open to the pump piston, in some cases it may be sufficient to rely on the volume of the pipe 6 to permit the pump to gain the desired headway.

Having now described my invention, what I claim as new and desire to secure by Letters Patent, is:—

1. The combination with a pump, a storage reservoir for the fluid compressed by the pump, a governor for said pump and a receptacle intermediate the pump and reservoir into which the pump is adapted to compress fluid, of a valve device operated by fluid under pressure controlled by the governor for controlling an exhaust port from said receptacle.

2. The combination with a pump, a storage reservoir for the fluid compressed by the pump, and a receptacle intermediate the pump and reservoir into which the pump is adapted to compress fluid, of a valve for controlling an exhaust port from said receptacle, a movable abutment for operating said valve subject on one side to fluid pressure and having means tending to equalize the fluid pressures on opposite sides thereof, and means operating upon cutting the pump into action for releasing fluid from one side of said abutment to actuate the valve and open said exhaust port.

3. The combination with a pump, a storage reservoir for receiving fluid compressed by the pump, a receptacle intermediate the pump and reservoir into which the pump is adapted to compress fluid, and a governor operating according to the degree of pump pressure for cutting the pump into and out of action, of a valve for controlling an exhaust port from said receptacle, a movable abutment subject on one side to pump pressure for operating said valve, and means controlled by the governor for varying the fluid pressure on the opposite side of said abutment to actuate the same.

4. The combination with a pump, a storage reservoir for receiving fluid compressed by the pump, a receptacle intermediate the pump and reservoir into which the pump is adapted to compress fluid, and a governor operating according to the degree of pump pressure for cutting the pump into and out of action, of a valve for controlling an exhaust port from said receptacle, a movable abutment subject on one side to pump pressure for operating said valve, said governor having means adapted upon movement to the cut out position to admit fluid under pressure to the opposite side of said abutment and upon movement to the cut in position to release fluid therefrom and thereby actuate the valve to open said exhaust port.

5. The combination with a pump, a storage reservoir for receiving fluid compressed by the pump, a receptacle intermediate the pump and reservoir into which the pump is adapted to compress fluid, and a governor operating according to the degree of pump pressure for cutting the pump into and out of action, of a valve for controlling an exhaust port from said receptacle, a movable abutment subject on one side to pump pressure for operating said valve, said governor comprising a piston for actuating an electric switch and adapted to control a port leading to said movable abutment, whereby in one position of the switch actuating piston fluid under pressure is admitted to the abutment and in another position said abutment is open to the atmosphere.

6. The combination with a pump, a storage reservoir for the fluid compressed by the pump and a receptacle intermediate the pump and reservoir into which the pump compresses fluid, of a valve device for releasing fluid from the receptacle upon cutting the pump out of action and means for preventing back flow from the reservoir to the pump, said means being adapted upon cutting the pump into action to open up a free communication from the pump to the reservoir.

7. The combination with a pump, a storage reservoir for the fluid compressed by the pump and a receptacle intermediate the pump and reservoir into which the pump compresses fluid, of a valve device for releasing fluid from the receptacle upon cutting the pump out of action and a check valve operated by said valve device for closing communication from the reservoir to the pump and adapted upon cutting in the pump to freely open said communication.

8. The combination with a pump for compressing fluid, a storage reservoir for the pump, a valve mechanism for relieving the pump piston of fluid pressure upon cutting the pump out of action, of a check valve operated by gravity for opening communication from the reservoir to the pump and means for operating said check valve to close said communication upon relieving the pump piston of fluid pressure.

9. The combination with an air compressor, a reservoir for fluid compressed by the compressor, and a receptacle through which fluid is p nped into the reservoir, of a governor for said compressor and a fluid pressure operated valve device adapted upon movement of said governor to cut out the compressor to relieve said receptacle of the pressure of the fluid compressed and thereby relieve the compressor of load at starting.

10. The combination with an air pump, a storage reservoir, and a receptacle between the pump and reservoir, of a governor for the pump and means adapted to be operated by fluid under pressure upon movement of the governor to cut out position for effecting the release of fluid from said receptacle to thereby relieve the compressor of load at starting.

11. The combination with an air pump, and a receptacle into which the pump compresses fluid, of a valve device for relieving the receptacle of pressure upon stopping said pump, comprising a valve for controlling an exhaust outlet from said receptacle and a piston subject to the opposing pressures of the pump and a spring for actuating said valve.

12. The combination with an air pump and a receptacle into which the pump compresses fluid, of a valve device for relieving the receptacle of pressure upon stopping said pump, comprising a valve for controlling an exhaust outlet from said receptacle, a piston subject to the opposing pressures of the pump and a spring for actuating said valve, and a check valve for preventing back flow from the reservoir to the pump.

In testimony whereof I have hereunto set my hand.

WALTER V. TURNER.

Witnesses:
R. F. EMERY,
A. M. CLEMENTS.